United States Patent
Hong et al.

(10) Patent No.: US 7,368,521 B2
(45) Date of Patent: May 6, 2008

(54) METHOD OF PRODUCING MODIFIED POLYCARBONATE USING SPRAY-CRYSTALLIZING METHOD

(75) Inventors: Mijeung Hong, Daejeon (KR); Jong Hun Kim, Daejeon (KR); Sung Kyou Park, Busan (KR); Boo Gon Woo, Daejeon (KR)

(73) Assignee: LG Chem, Ltd. (KR)

( * ) Notice: Subject to any disclaimer, the term of this patent is extended or adjusted under 35 U.S.C. 154(b) by 87 days.

(21) Appl. No.: 11/268,192

(22) Filed: Nov. 7, 2005

(65) Prior Publication Data
US 2006/0100413 A1 May 11, 2006

(30) Foreign Application Priority Data
Nov. 6, 2004 (KR) ............... 10-2004-0090155
Apr. 1, 2005 (KR) ............... 10-2005-0027575

(51) Int. Cl.
*C08F 6/00* (2006.01)

(52) U.S. Cl. ............. 528/196; 422/131; 528/198; 528/480

(58) Field of Classification Search ........ 422/131; 528/196, 198, 480
See application file for complete search history.

(56) References Cited

U.S. PATENT DOCUMENTS

| | | | |
|---|---|---|---|
| 4,983,706 A | 1/1991 | Fontana et al. | 528/176 |
| 5,530,083 A | 6/1996 | Phelps et al. | 528/25 |
| 6,232,429 B1 | 5/2001 | Banach et al. | 528/176 |
| 6,252,013 B1 | 6/2001 | Banach et al. | 525/464 |
| 6,365,702 B1 | 4/2002 | Hait et al. | 528/196 |
| 7,148,312 B2 * | 12/2006 | Kim et al. | 528/196 |

FOREIGN PATENT DOCUMENTS

| | | | |
|---|---|---|---|
| KR | 2004-44664 | * | 7/2004 |
| KR | 2004-440663 | * | 7/2004 |
| KR | KP-440663 | | 7/2004 |
| KR | KP-440664 | | 7/2004 |

* cited by examiner

*Primary Examiner*—Terressa Boykin
(74) *Attorney, Agent, or Firm*—Lerner, David, Littenberg, Krumholz & Mentlik, LLP

(57) ABSTRACT

Provided is a method of producing a high-molecular weight modified polycarbonate resin. The method includes a melt condensation polymerization process in which transesterification and quick condensation polymerization are sequentially performed, a spray crystallization process, and a solid state polymerization process. When this method is used, solid state polymerization can be performed without additional drying, milling and fractionation processes so that the operation time and costs are highly reduced. In addition, crystallinity and size of crystallized modified polycarbonate particles can be efficiently controlled to produce a high-molecular weight modified polycarbonate having uniform physical properties in the solid state polymerization.

16 Claims, 1 Drawing Sheet

METHOD OF PRODUCING MODIFIED POLYCARBONATE USING SPRAY-CRYSTALLIZING METHOD

CROSS-REFERENCE TO RELATED PATENT APPLICATIONS

This application claims the benefits of Korean Patent Application Nos. 10-2004-0090155, filed on Nov. 6, 2004, and 10-2005-0027575, filed on Apr. 1, 2005 in the Korean Intellectual Property Office, the disclosures of which are incorporated herein in their entirety by reference.

BACKGROUND OF THE INVENTION

1. Field of the Invention

The present invention relates to a method of preparing a modified polycarbonate resin. The method includes condensation polymerization and spray-crystallization to decrease a mole fraction of arylcarbonate existing in a non-reacted diarylcarbonate, and in a terminated group of a reaction side product having a degree of polymerization of less than 3 produced through melt condensation, so that an increase of the molecular weight of the modified polycarbonate resin produced through solid polymerization can be maximized. In this method, spray crystallization method is used, and a separate milling and drying processes are not required. The spray crystallization and the solid polymerization sequentially or concurrently in one reactor occur without additional drying, milling and fractionation processed so that the time required to prepare a modified polycarbonate is substantially reduced.

2. Description of the Related Art

Polycarbonate resins have excellent heat resistance, impact resistance, mechanical strength, and transparency. Due to these advantages, polycarbonate resins are used in various applications, such as compact discs, transparent sheets, packaging materials, and ultraviolet (UV)-blocking films, and thus, the demand for polycarbonate resins is increasing.

However, polycarbonates have low solvent resistance, and low impact resistance at low temperature. For example, when polycarbonates are exposed to commonly used solvents, crazing or cracking occurs. Thus, many efforts have been made to overcome these problems, and various modified polycarbonates have been developed. The modified polycarbonates mean the polycarbonate having not only carbonate groups but also other functional groups, for example, ester groups, ether groups, sulfide groups, sulfoxide groups, and siloxane groups, etc., in their chemical structures. In particular, polycarbonates modified with siloxanes exhibit superior low-temperature impact resistance, and processibility.

Conventional manufacturing processes for producing modified polycarbonates may be categorized into interfacial polymerization process in which phosgene is used, and melt polymerization process and solid polymerization process in which phosgene is not used.

First of all, in the case of polycarbonate modified with ester group, we can find the followings.

An interfacial polymerization process disclosed in U.S. Pat. No. 4,983,706 includes reacting an aromatic dihydroxy compound, such as a bisphenol-A, with phosgene, and a dicarboxylic acid. However, the process is accompanied by a risk caused by the use of harmful chemical materials, phosgene, and a chloride-based organic solvent, which is an environmental pollutant, and thus, equipment cost and manufacturing cost are high.

U.S. Pat. No. 6,232,429 discloses the method, by which a modified polycarbonate can be produced through melt polymerization, after transesterification reaction between an aromatic dihydroxy compound and a carbonic acid diester and esterification reaction of an aromatic dihydroxy compound with a dicarboxylic acid compound, which are performed at the same time using an alkali earth metal catalyst and a quaternary ammonium catalyst. This melt polymerization process is relatively stable because a poisonous material is not used. However, in order to produce high-molecular weight modified polycarbonate for extrusion, the highly viscous reactants must be handled at a high temperature and in a high vacuum, and these conditions lead to a low quality of modified polycarbonate.

U.S. Pat. No. 6,365,702 discloses a solid polymerization method for a modified polycarbonate. More particularly, a polycarbonate oligomer, a carboxylic acid compound, and a diarylcarbonate compound are subjected to esterification and transesterification using an antimony-based catalyst, and the resultant product is cooled and milled. The milled product is subjected to the solid polymerization. In this method separate milling and drying processes should be required.

Further, in the case of polycarbonate modified with siloxane, we can find the followings.

U.S. Pat. No. 5,530,083 discloses an interfacial polmerization process including reacting an aromatic hydroxy compound, a dihydroxy compound and hydroxyaryl-terminated dioganopolysiloxane with a phosgene, by using a catalyst. In this case, a high-molecular weight polycarbonate modified with siloxane resin can be easily produced continuously. However, the process is risky due to the use of a poisonous gas and an environmentally harmful chloride-based organic solvent, and thus, equipment cost and manufacturing cost are high.

A melt polymerization process includes polymerizing a melted starting material, as disclosed in U.S. Pat. No. 6,252,013. The melt condensation polymerization is less risky because poisonous materials are not used. However, in order to produce a modified high-molecular weight polycarbonate for extrusion, highly viscous reactants must be handled at a high temperature and in a high vacuum, and these conditions lead to a low quality of modified polycarbonate.

A solid polymerization process is a process in which a low-molecular weight modified polycarbonate prepolymer is crystallized and the crystallized prepolymer is polymerized more at a temperature lower than a melting point of the crystallized prepolymer. In this case, a poisonous material is not used, and the quality of an obtained modified polycarbonate can be guaranteed because the polymerization occurs in a solid state. In general, however, the crystallization and the solid polymerization are performed without removing reaction side products having a degree of polymerization of less than 3 and non-reacted diarylcarbonate which co-exists with a relatively low-molecular weight prepolymer (weight average molecular weight of 2000 to 20000 g/mol.) As a result, the stoichiometric balance between hydroxyl group and arylcarbonate group is broken, and the production time for a high-molecular weight modified polycarbonate increases. In this method, the amorphous prepolymer is crystallized by dissolving it in a solvent and then precipitating it. Therefore, the size and the crystallinity of the crystallized prepolymer are irregular, and separate drying, milling and fractionation processes are needed.

Accordingly, more research needs to be carried out to develop a modified polycarbonate manufacturing method that is stable, guarantees quality, and requires a short time to produce a high-molecular weight modified polycarbonate.

SUMMARY OF THE INVENTION

The present invention provides a method of producing a high-molecular weight modified polycarbonate with uniform physical properties by efficiently controlling the crystallinity and the size of crystallized modified polycarbonate particles. The method does not require additional drying, milling and fractionation processes, and thus, an operation time and operating costs can be reduced.

The present invention also provides a modified polycarbonate produced using the method.

According to an aspect of the present invention, there is provided a method of producing a modified polycarbonate resin by crystallizing and solid state polymerizing a modified polycarbonate with rather low molecular weight sequentially or concurrently in one reactor without separate milling and drying processes.

According to another aspect of the present invention, there is provided a modified polycarbonate produced using the above-described method.

In addition, the crystallinity and size of crystallized particles are efficiently controlled to provide a high-molecular weight modified polycarbonate with homogenous physical properties.

BRIEF DESCRIPTION OF THE DRAWINGS

The above and other features and advantages of the present invention will become more apparent by describing in detail exemplary embodiments thereof with reference to the attached drawing in which.

DETAILED DESCRIPTION OF THE INVENTION

Figure 1:
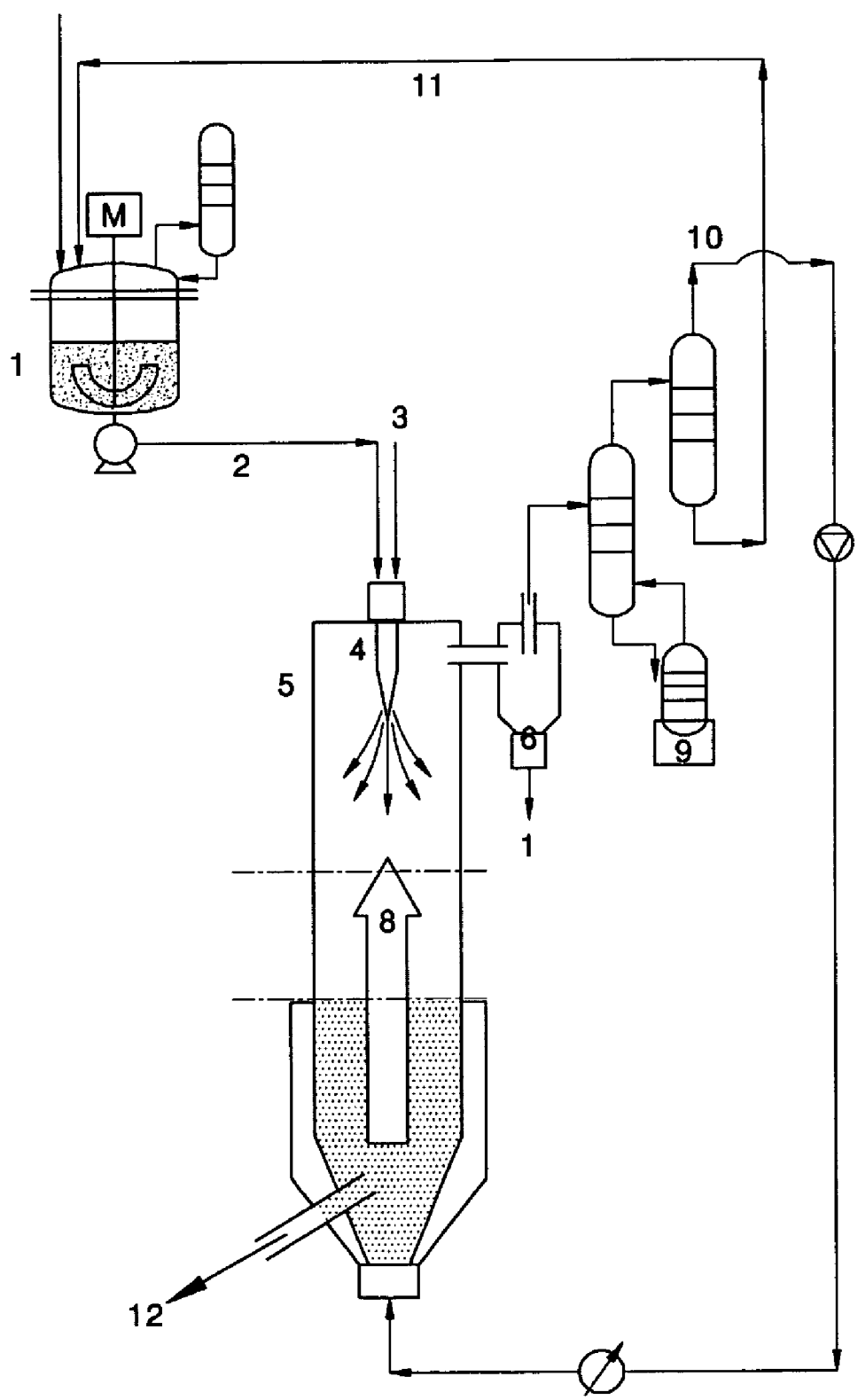
FIG. 1 is a schematic view of an apparatus used to intensively solid polymerize a modified polycarbonate.

In a method of producing a modified polycarbonate resin by a solid state polymerization process, an amorphous modified polycarbonate should be additionally crystallized before a solid polymerization to increase a melting point of the amorphous modified polycarbonate and to prevent fusing of a modified polycarbonate during the solid polymerization.

In an embodiment of the present invention, spray-crystallization and solid polymerization can be performed at the same time in a solid polymerization reactor illustrated in FIG. 1. In another embodiment of the present invention, spray-crystallization and solid polymerization can be sequentially performed. The amorphous modified polycarbonate described above may be a polycarbonate modified with ester groups or siloxane groups.

An intensive solid state polymerization process will now be described.

First, an amorphous modified polycarbonate is dissolved in a solvent. The amorphous modified polycarbonate may be prepared through an interfacial polymerization process, through transesterification of dialkyl(aryl)carbonate and an aromatic dihydroxy compound.

The solvent used to prepare the modified polycarbonate solution may be methylenechloride, chloroform, tetrahydrofurane, metacrezole, cyclohexane, dioxane, dimethylaldehyde, pyridine, or a mixture of these.

The concentration of the modified polycarbonate solution in the result may be in the range of 5.0-50.0% by weight, and preferably, 10.0-30.0% by weight. When the concentration of the modified polycarbonate solution is less than 5.0% by weight, crystallinity of the produced modified polycarbonate is so high that a high-molecular weight modified polycarbonate resin cannot be produced and a larger amount of the solvent should be needed and recovered. On the other hand, when the concentration of the modified polycarbonate solution is greater than 50.0% by weight, the viscosity of the modified polycarbonate solution is so high that the modified polycarbonate solution is not sprayed well.

Then, the prepared modified polycarbonate solution is transferred to a solid polymerisation reactor and sprayed through a nozzle in the solid polymerization reactor. At this time, the modified polycarbonate solution may be sprayed through a pressure nozzle or a pneumatic nozzle. When a pneumatic nozzle is used, a compressed carrier gas is separately injected.

When a pressure nozzle is used, an injection pressure may range from 2.0 to 51.0 kgf/cm$^2$. When the spray pressure is less than 2.0 kgf/cm$^2$, an inlet of the pressure nozzle may be easily clogged when the modified polycarbonate solution is sprayed. On the other hand, when the injection pressure is greater than 51.0 kgf/cm$^2$, an excessive amount of the modified polycarbonate solution is sprayed such that some of the solution is not vaporized and an excessive amount of the solvent remains in a subsequent process.

When a pneumatic nozzle is used, the injection speed of the compressed gas may be in the range of 200-800 L/hour, and preferably, 300-600 L/hour. When the injection speed of the compressed gas is less than 200 L/hour, the amount of a solvent that is not vaporized and thus exists in produced crystallized modified polycarbonate particles increases substantially. On the other hand, when the injection speed of the compressed gas is greater than 800 L/hour, most crystallized particles produced have a diameter of less than 80 μm and a degree of crystallinity is less than 5%. The compressed gas may include at least one gas selected from the group consisting of $N_2$, air, $CO_2$, and their mixtures.

The sprayed solution is vaporized by contacting high-temperature gas, thereby producing a crystallized modified polycarbonate.

As described above, when a crystallized modified polycarbonate is produced through spray crystallization, the modified polycarbonate can be crystallized and dried at the same time, and the particle size of the crystallized modified polycarbonate is very regular. Therefore, the additional drying, milling, and fractionation processes are not required, and the manufacturing process is simplified and the manufacturing costs are low.

The hot gas that is used to vaporize the modified polycarbonate solution may be $N_2$, the air, $CO_2$, or the mixtures of these. The gas may have a temperature sufficiently high to be able to vaporize the solvent of the solution. For example, the temperature of the gas may be in the range of 40-250° C., and preferably, 60-150° C.

When the temperature of the hot gas is lower than 40° C., the solvent is slowly, insufficiently vaporized, and cannot be directly subjected to a solid polymerizing process. Therefore, an additional drying process is required to further vaporize the solvent. When the temperature of the hot gas is higher than 250° C., the solvent vaporizes very quickly and thus a degree of crystallinity decreases. Therefore, the resultant crystallized modified polycarbonate particles cannot be directly subjected to a solid polymerizing method, because, they are fused during the solid state polymerization.

An average diameter of the crystallized modified polycarbonate particles may be in the range of 80-3000 µm. The range of error in the diameter of a particle is less than 30%.

When the particles have a diameter of less then 80 µm or greater than 3000 µm, a degree of crystallinity of them may be too low or too high. In addition, the particles having such diameter ranges are unsuitable for reduced pressure or nitrogen injection conditions required for the solid polymerization. Further, when the range of error in the diameter of particle that remain after the solvent is vaporized is greater than 30%, physical properties of crystalline polyester carbonate are not homogenous.

The method of producing a crystallized modified polycarbonate according to an embodiment of the present invention will now be described in detail with reference to FIG. 1.

Amorphous modified polycarbonate is agitated in a solvent in an agitator 1 to be dissolved.

The resulting solution is transferred to a solid polymerization reactor 5 through a transfer tube 2 while being sprayed by a compressed gas 3 through a spray nozzle 4. An optimal injection speed of the compressed gas 3 which is injected into the spray nozzle 4 may vary according to a concentration of the solution. When a pressure nozzle is used instead of the pneumatic nozzle, the compressed gas is not used, and instead, the injection pressure of the solution is increased to 2.0 kgf/cm² or greater.

A hot (high-temperature) gas 8 is injected through an inlet tube for the hot gas in a direction opposite to the direction in which the solution is sprayed, to vaporize the solvent of the solution. The vaporized solvent and the hot gas 8 are separated into a liquid solvent and gas. The liquid solvent is refluxed to the agitator 1, and the gas is heated and injected into the solid polymerization reactor 5.

A modified polycarbonate is collected in an coagulation vessel 12 installed below the solid polymerization reactor 5, and micro-sized particles with low crystallinity are collected in an aggregation cyclone 6.

In another embodiment, a spray crystallizing process and a solid polymerizing process can be sequentially performed. That is, the present invention also includes spray crystallizing an amorphous polycarbonate to produce a crystallized modified polycarbonate, and then solid-state polymerizing the crystallized modified polycarbonate to produce a high molecular weight modified polycarbonate.

When the amorphous modified polycarbonate is polycarbonate modified with ester groups, the method may include:

(a) crystallizing an amorphous modified carbonate with ester groups having a number average molecular weight of 3,000-20,000 g/mol to produce a crystallized modified carbonate with ester groups; and (b) solid-state polymerizing the crystallized modified carbonate with ester groups to produce a crystalline modified modified carbonate with ester groups with a number average molecular weight of 15,000 to 200,000 g/mol.

When the amorphous modified polycarbonate is an amorphous modified carbonate with siloxane groups, the method may include:

(a') crystallizing an amorphous modified carbonate with siloxane groups having a weight average molecular weight of 10,000-30,000 g/mol to produce a crystallized modified carbonate with siloxane groups; and (b') solid-state polymerizing the crystallized modified carbonate with siloxane groups to produce a modified carbonate with siloxane groups with a weight average molecular weight of 20,000 to 200,000 g/mol.

The amorphous modified polycarbonate may be prepared through an interfacial polymerisation process, through transesterification of dialkyl(aryl)carbonate and an aromatic dihydroxy compound, or through transesterification and condensation of dialkyl(aryl)carbonate and an aromatic dihydroxy compound.

The spray crystallizing process may include dissolving an amorphous modified polycarbonate in a solvent to prepare a solution, spraying the solution through a nozzle, and contacting the sprayed solution and a hot gas to vaporize the solvent so that the solvent is removed and a crystallied modified polycarbonate is produced.

Conditions for the spray crystallization may be the same as conditions for above-described solid polymerisation.

The solid state polymerization may be performed by transferring the prepared crystallized modified polycarbonate to a solid state polymerization reactor and continuously providing a hot gas thereto to produce a high-molecular weight modified polycarbonate resin. Alternatively, the solid state polymerization can be performed by transferring the prepared crystallized modified polycarbonate to a solid state polymerization reactor under a reduced pressure of 0-50 mmHg to produce a high-molecular weight modified polycarbonate resin while by-products are removed. When the modified polycarbonate resin produced through solid state polymerization is a modified polycarbonate resin with ester groups, a modified polycarbonate resin with ester groups having a number average molecular weight of 15,000 to 200,000 g/mol is produced. When the modified polycarbonate resin produced through solid state polymerization is a modified polycarbonate resin with siloxane groups, a modified polycarbonate resin with siloxane groups having a weight average molecular weight of 20,000 to 200,000 g/mol is produced.

The modified polycarbonate produced through spray crystallization does not require separate milling and drying processes for use.

The solid state polymerization process is performed at a solid state polymerization temperature $T_p$, which can be maintained constant or increased within the temperature range as indicated by the Inequality below:

$$T_m - 50 \leq T_p \leq T_m \tag{1}$$

where $T_m$ is a melting point.

In the solid state polymerization process, when needed, additives, such as a terminator, a branching agent, an antioxidant, and the like in a powder, liquid, or gas state may be further used to increase the quality of a produced modified polycarbonate resin.

When a modified polycarbonate resin prepared through the above-described stages is a modified polycarbonate resin with ester groups, a number average molecular weight of it may be in the range of 15,000-200,000 g/mol. When a modified polycarbonate resin prepared through the above-describe stages is a modified polycarbonate resin with siloxane groups, a weight average molecular weight of it may be in the range of 20,000-200,000 g/mol. These modified polycarbonate resins are suitable for extrusion and blow molding.

When a modified polycarbonate produced using a conventional crystallizing method is solid state polymerized, the polydispersity index of the modified polycarbonate is increased by 55-65% after solid state polymerization. On the other hand, when a crystalline modified polycarbonate produced according to an embodiment of the present invention is solid state polymerized, the polydispersity index of the modified polycarbonate is increased by as little as 14.5% or less because the crystalline modified polycarbonate has a uniform particle size and homogenous crystallinity, so that a high-molecular weight polycarbonate resin having a uniform molecular weight and homogenous physical properties can be produced.

When an amorphous modified polycarbonate that is used in a spray crystallizing process according to an embodiment of the present invention is an amorphous modified polycarbonate with ester groups, a method of producing the amorphous modified polycarbonate with ester groups may include:

a) concurrently performing esterification of a dicarboxylic acid compound and an aromatic dihydroxy compound and transesterification between a diaryl(alkyl)carbonate compound and an aromatic dihydroxy compound in the presence of a catalyst to produce a low-molecular weight amorphous polyester carbonate prepolymer with a number average molecular weight of 1,500 to 15,000 g/mol; and b) condensation polymerizing the low-molecular weight amorphous modified polycarbonate with ester groups prepolymer obtained from operation a).

Hereinafter, the method of producing the amorphous modified polycarbonate with ester groups will be described in detail.

Step 1: Transesterification and Esterification

The concentration of the catalyst included may be in the range of $10^{-6}$ to $10^{-1}$ mol, preferably, $10^{-5}$ to $10^{-2}$ mol, and more preferably, of $10^{-4}$ to $10^{-3}$ mol, based on 1 mol of a dihydroxy compound that is used as a starting material for the transesterification process according to an embodiment of the present invention. When the concentration of the catalyst is less than $10^{-6}$ mol based on 1 mol of the dihydroxy compound, the catalyst fails to sufficiently exert its activity at the beginning of the reaction. When the concentration of the catalyst is greater than $10^{-1}$ mol based on 1 mol of the dihydroxy compound, production costs are high.

The catalyst that is used in an embodiment of the present invention may be a tin-based catalyst. The tin-based catalyst is more suitable than an alkali earth metal catalyst, a quaternary ammonium salt catalyst, and an antimony-based catalyst in terms of color, transparency, and reactivity.

The tin-based catalyst may be a tin compound selected from the group consisting of dialkyltin trichloride, dialkyltin dichloride, dialkyltin oxide, dialkyltin dialkoxide, dialkyltin dicarboxylate, and tetraalkyl tin, wherein the alkyl may be a C1-C20 alkyl, preferably, a C1-C10 alkyl, and more preferably, a C1-C6 alkyl. The tin-based catalyst may be one of the compounds represented by

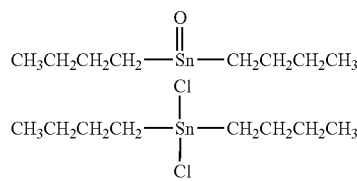

-continued

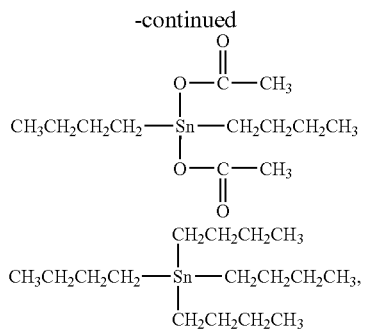

and preferably, dibutyltin oxide.

The dicarboxylic acid compound that is one of starting materials according to an embodiment of the present invention may be represented by formula 1:

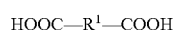    [Formula 1]

where $R^1$ is a substituted or non-substituted C4-C30 aryl group, a C1-C10 alkyl group, or a C5-C30 cycloalkyl group.

The dicarboxylic acid compound may be an acid selected from the group consisting of an oxalic acid, a succinic acid, a glutaric acid, an adipic acid, a pimelinic acid, a sebacic acid, a decandionic acid, a dodecandionic acid, a terephthalic acid, an isophthalic acid, and a combination of these.

For example, the dicarboxylic acid may be a 1,10-decandicarboxylic acid.

The aromatic dihydroxy compound that is a starting material according to an embodiment of the present invention may be a compound represented by formula 2:

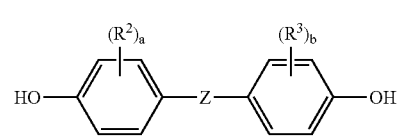    [Formula 2]

where $R^2$ and $R^3$ are each independently a halogen atom or a C1-C8 alkyl group, wherein the halogen atom may be F, Cl, Br, or I, and the C1-C8 alkyl group may be a methyl group, an n-propyl group, an isopropyl group, an n-butyl group, an isobutyl group, a sec-butyl group, a t-butyl group, a pentyl group, a hexyl group, a cyclohexyl group, a heptyl group, or an oxtyl group;

Z is a single bond, a C1-C8 alkylene group, a C2-C8 alkyliden group, a C5-C15 cycloalkylene group, a C5-C15 cycloalkylidene group, —S—, —SO—, —SO$_2$—, —O—, —CO—, a compound represented by formula 3, or a compound represented by formula 4, wherein the C1-C8 alkylene group or C2-C8 alkylidene group may be a methylene group, an ethylene group, a propylene group, a butylene group, a pentylene group, a hexylene group, an ethylidene group, an isopropylidene group, or the like; and the C5-C15 cycloalkylene group or C5-C15 cycloalkylidene group may be a cyclopentylene group, a cyclohexylene group, a cyclopentylidene group, or a cyclohexylidene group; and a and b are each independently an integer of 0 through 4:

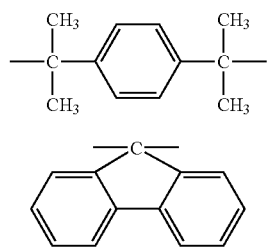
[Formula 3]

[Formula 4]

The aromatic dihydroxy compound represented by formula 2 may be a bis(hydroxyaryl)alkane such as bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-t-butyl-4-hydroxy-3-methylphenyl)ethane, 2,2-bis(4-hydroxyphenyl)propane (bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-t-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl)propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 2,2-bis(3,5-dichloro-4-hydroxyphenyl)butane, 2,2-bis(3,5-dibromo-4-hydrophenyl)butane, 4,4-bis(4-hydroxyphenyl)heptane, 1,1-bis(2-t-butyl-4-hydroxy-5-methylphenyl)heptane, 2,2-bis(4-hydroxyphenyl)octane, 1,1-(4-hydroxyphenyl)ethane, or the like; a bis(hydroxyaryl)cycloalkane such as 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane, 1,1-bis(4-hydroxyphenyl)-3,5,5-trimethylcyclohexane, or the like; a bis(hydroxyaryl)ether such as bis(4-hydroxyphenyl)ether, bis(4-hydroxy-3-methylphenyl)ether, or the like; a bis(hydroxyaryl)sulfide such as bis(4-hydroxyphenyl)sulfide, bis(3-methyl-4-hydroxyphenyl)sulfide, or the like; a bis(hydroxyaryl)sulfoxide such as bis(hydroxyphenyl)sulfoxide, bis(3-methyl-4-hydroxyphenyl)sulfoxide, bis(3-phenyl-4-hydroxyphenyl)sulfoxide, or the like; a bis(hydroxyaryl)sulfone such as bis(4-hydroxyphenyl)sulfone, bis(3-methyl-4-hydroxyphenyl)sulfone, bis(3-phenyl-4-hydroxyphenyl)sulfone, or the like; or a dihydroxybiphenyl such as 4,4'-dihydroxyphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl, 3,3-difluoro-4,4'-dihydroxybiphenyl, or the like.

The aromatic dihydroxy compound may be, in addition to the compound represented by formula 2, dihydroxybenzene that is substituted with dihydroxybenzene, halogen, or an alkyl group. Such an aromatic dihydroxy compound may be resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,5-dichlorohydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, or the like.

The aromatic dihydroxy compound according to an embodiment of the present invention may be bisphenol A.

The diarylcarbonate that is one of starting materials used for the transesterification may be a compound represented by formula 5 or a compound represented by formula 6:

[Formula 5]

where $Ar^1$ and $Ar^2$ are each independently an aryl group, and

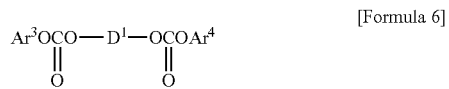
[Formula 6]

where $Ar^3$ and $Ar^4$ are each independently an aryl group, and $D^1$ is a residue obtained by removing two hydroxyl groups from the aromatic dihydroxy compound represented by formula 2.

The diarylcarbonate represented by formula 5 or formula 6 may be diphenyl carbonate, ditolyl carbonate, bis(chlorophenyl) carbonate, bis(m-cresyl)carbonate, dinaphtyl carbonate, bis(diphenyl)carbonate, bisphenol A-bisphenolcarbonate, or the like.

For example, the diarylcarbonate that is a starting material used for transesterification according to an embodiment of the present invention may be diphenyl carbonate.

The dicarboxylic acid compound may have a concentration of $10^{-4}$ to 1 mol, preferably, $10^{-3}$ to 0.5 mol, and more preferably, 0.05 to 0.1, based on 1 mol of the diarylcarbonate compound. When the concentration of the dicarboxylic acid compound is outside this range, a modified polycarbonate may not exhibit desired physical properties.

The concentration of the diarylcarbonate may be in the range of 1.0 to 1.5 mol, preferably, 1.0 to 1.3 mol, more preferably, of 1.0 to 1.2 mol, based on 1 mol of the dihydroxy compound. When the concentration of the diarylcarbonate is outside this range, a degree of polymerization given by the following equation is low:

$$\overline{X}_n = \frac{1+r}{1+r-2rp} \qquad \text{[Equation 1]}$$

where r is a mol ratio of a hydroxy compound with respect to a carbonate group, $X_n$ is a degree of polymerization, and p is an extent of reaction. When p is 1.0, Equation 1 becomes Equation 2. In this case, when r is very close to 1.0, the degree of polymerization can be maximized in a short time:

$$\overline{X}_n = \frac{1+r}{1-r}. \qquad \text{[Equation 2]}$$

When the modified polycarbonate resin is produced through esterification and transesterification according to an embodiment of the present invention, if needed, additives, such as a terminator, an antioxidant, and the like, may be additionally used.

The terminator may be o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 3,5-di-cumylphenol, 3,5-dicumylphenol, a compound represented by formula 7, a compound represented by formula 8, a compound represented by formula 9, a compound represented by formula 10, a compound represented by formula 11, a compound represented by formula 12, or a monovalent phenol, such as a croman derivative represented by formula 13 or formula 14:

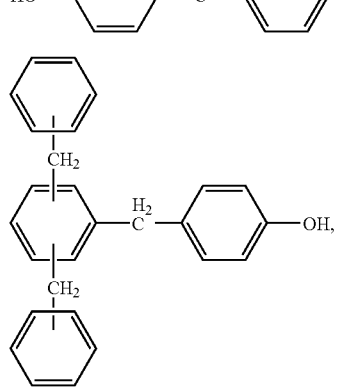

[Formula 7]

[Formula 8]

[Formula 9]

where n is an integer of 7 through 30, $$C_nH_{2n+1}\text{—OH} \qquad \text{[Formula 10]}$$

where n is an integer of 7 through 30,

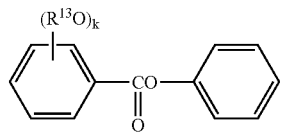

[Formula 11]

where $R^{13}$ is a C1-C12 alkyl group and k is an integer of 1 through 3,

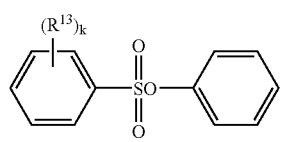

[Formula 12]

where $R^{13}$ is a C1-C12 alkyl group and k is an integer of 1 through 3,

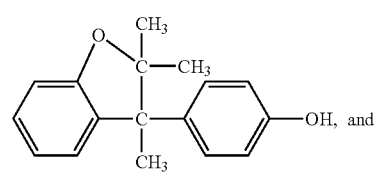

[Formula 13]

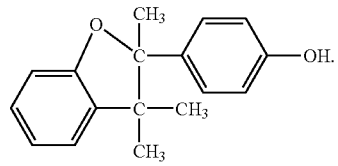

[Formula 14]

For example, the terminator may be one of p-t-butylphenol, p-cumylphenol, p-phenylphenol, and the compounds represented by formulae 11 through 14.

The concentration of the terminator may be in the range of 0.01 to 10 mol % based on 1 mol of the aromatic dihydroxy compound that is used as a starting material used for the transesterification process according to an embodiment of the present invention.

The entire amount of the terminator may be added at the beginning of the transesterification. Alternatively, the terminator may be added gradually in portions throughout the transesterifiaction. Alternatively, the entire amount of the terminator may be added at a specified time after the beginning of the transesterification of the aromatic dihydroxy compound and the diarylcarbonate.

The antioxidant may be a phosphor-based antioxidant. Examples of the phosphine-based antioxidant include a trialkyl phosphite such as trimethyl phosphite, triethyl phosphite, tributyl phosphite, trioctyl phosphite, trinonyl phosphite, tridecyl phosphite, trioctadecyl phosphite, distearyl pentaeritritol diphosphite, tris(2-chloroethyl)phosphite, or tris(2,3-dichloropropyl)phosphite, or the like; a tricycloalkyl phosphite such as tricyclohexyl phosphite, or the like; a triaryl phosphite such as triphenyl phosphite, tricresyl phosphite, tris(ethylphenyl)phosphite, tris(butylphenyl)phosphite, tris(nonylphenyl)phosphite, tris(hydroxyphenyl)phosphite, or the like; a monoalkyl diaryl phosphite such as 2-ethylhexyl diphenyl phosphite, or the like; a trialkyl phosphate such as trimethyl phosphate, triethyl phosphate, tributyl phosphate, trioctyl phosphate, tridecyl phosphate, trioctadecyl phosphate distearyl pentaeritritol diphosphate, tris(2-chloroethyl) phosphate, tris(2,3-dichloropropyl)phosphate, or the like; a tricycloalkyl phosphate such as tricyclohexyl phosphate, or the like; or a triaryl phosphate such as triphenyl phosphate, tricresyl phosphate, tris(nonylphenyl)phosphate, 2-ethylphenyl diphenyl phosphate, or the like.

According to the method of producing a modified polycarbonate resin according to an embodiment of the present invention, the aromatic dihydroxy compound and the diaryl carbonate are subjected to transesterification in the presence of a polymerization catalyst. In this case, additives, such as a terminator, a branching agent, an antioxidant, and the like, may be further added.

The temperature for the transesterification is not limited, and the transesterificaiton may occur at 100 to 330° C., preferably, 180 to 300° C., and more preferably, at a temperature that is gradually increased from 180° C. to 300° C. When the reacting temperature is lower than 100° C., the transesterification occurs slowly. When the reacting temperature is higher than 330° C., side reactions may occur, or the generated modified polycarbonate resin may be colored.

The pressure for the transesterification is not limited, and may be controlled according to a vapor pressure of a monomer that is used and a reaction temperature. At the beginning of the transesterification, the pressure may be in the range of 1 to 10 atm, and at the end of the transesterificaiton, the pressure may be reduced to 0.1 to 100 mbar.

The reaction time for the transesterification may be prolonged until a desired weight average molecular weight, which may range from 1,500 to 15,000 g/mol, is obtained. The reaction time for the transesterification can be in the range of 0.2 to 10 hours.

Transesterification can be performed in the absence of an inert solvent. However, when needed, transesterification can occur in the presence of 1 to 150% by weight of an inert solvent based on the total weight of the produced modified polycarbonate resin. The inert solvent may be an aromatic compound, such as diphenyl ether, halogenated diphenyl ether, benzophenone, polyphenylene ether, dichlorobenzene, methylnaphthalene, or the like; or a cycloalkane such as tricyclo(5,2,10)decane, cyclooctane, cyclodecane, or the like.

In some cases, the transesterification may occur in an inert gas atmosphere. The inert gas may be a gas such as $Ar_2$, $CO_2$, $N_2O$, or $N_2$; chlorofluoro hydrocarbonate; alkane, such as ethane or propane; or an alkene such as ethylene or propylene.

As a result of transesterification under the above conditions, a phenol corresponding to the used dialrylcarbonate or an ester thereof, water, and an inert solvent are separated from a reactor. These separated elements may be separated, purified, and reproduced. The transesterification may be performed using a predetermined apparatus in a batch type or a continuous type.

Step 2: Condensation Polymerization

The low molecular weight modified polycarbonate prepolymer with ester groups having the weight-average molecular weight of 1,500 to 20,000 g/mol, which is prepared through the transesterification, is subjected to condensation polymerization under a reduced pressure at high temperature, or in a nitrogen atmosphere. As a result of the condensation polymerization, diarylcarbonate that exists in unreacted form during the transesterification, reaction side products having a degree of polymerization of less than 3, and a reaction side product that is produced during the reaction, such as phenol, are removed, and an medium molecular weight amorphous modified polycarbonate with ester groups which has a greater molecular weight than the low molecular weight of amorphous polycarbonate prepolymer is produced.

In the condensation polymerization, unreacted diarylcarbonate, which is not involved in the reaction due to its comparatively low boiling point, and reaction side products having a degree of polymerization of less than 3 are vaporized together with phenol that is a reaction side product, to be extracted outside the reactor. Such a removing process is more effective for increasing the molecular weight of a modified polycarbonate during the solid state polymerization than a conventional process.

In a conventional process, excess diarylcarbonate that is not used in the transesterification process and reaction side products having a degree of polymerization of less than 3 are not removed through a condensation polymerization process before the solid state polymerization. In addition, as the molecular weight of the prepolymer increases, the mole fraction difference between arylcaronate end-group and the aromatic hydroxy end-group is increased. Therefore, the solid state polymerization process used to produce a high molecular weight modified polycarbonate with ester groups is prolonged.

The condensation polymerization according to the current embodiment of the present invention may be performed using a conventional condensation reactor, such as a rotating disk reactor, a rotating cage reactor, or a thin film reactor.

The condensation polymerization may be performed at 180 to 330° C., and preferably, 200 to 300° C.

In the condensation polymerization process, unreacted dialkyl(aryl)carbonate that exists after the transesterification and esterification, reaction side products having a degree of polymerization of less than 3, phenol produced as a side product, and water are removed under a reduced pressure of 0-50 mmHg, preferably 0-20 mmHg, in the high temperature range described above.

According to an embodiment of the present invention, nitrogen injection may be used instead of the reduced pressure to remove the reaction side products. In this case, the amount of nitrogen that is injected is in the range of 0.01 to 1.0 $Nm^3$/kg·h. The reaction time may vary according to reaction conditions, and may be in the range of 2 to 120 minutes.

The the weight average molecular weight of the medium molecular weight amorphous modified polycarbonate with ester groups prepared in the above-described process may be in the range of 3,000 to 20,000 g/mol.

When an amorphous modified polycarbonate that is used in a spray crystallizing process according to an embodiment of the present invention is an amorphous modified polycarbonate with siloxane groups, a method of producing the amorphous modified polycarbonate with siloxane groups may include:

a') performing transesterification between diarylcarbonate, dihydroxyl polysiloxane and aromatic dihydroxy compound in the presence of a catalyst to produce an amorphous modified polycarbonate prepolymer with siloxane groups having a weight average molecular weight of 1,500-20,000 g/mol; and b') condensation polymerizing the amorphous modified polycarbonate prepolymer with siloxane groups (obtained from operation a').

Hereinafter, the method of producing the amorphous modified polycarbonate with siloxane groups will be described in detail.

Step 1: Transesterification

A polymerization catalyst that is used in an embodiment of the present invention may be a metal compound catalyst, a non-metal compound catalyst, or a combination of these. The metal compound catalyst may be a salt compound, such as a hydroxide, acetate, alkoxide, carbonate, hydride, hydrate, or oxide of an alkali metal or an alkali earth metal; an organometallic compound containing a transition metal, such as Zn, Cd, Ti, or Pb; an aluminum hydride; or borohydride.

The non-metal compound catalyst may be a quaternary ammonium salt, such as tetramethyl ammonium hydroxide, tetramethyl ammonium acetate, tetramethyl ammonium formate, tetramethyl ammonium carbonate, tetraethyl ammonium hydroxide, tetrapropyl ammonium hydroxide, tetrabutyl ammonium hydroxide, tetraphenyl ammonium hydroxide, trimethylphenyl ammonium hydroxide, or the like; a quaternary phosphonium salt, such as tetramethyl phosphonium hydroxide, tetramethyl phosphonium acetate, tetramethyl phosphonium formate, tetramethyl phosphonium carbonate, tetraethyl phosphonium hydroxide, tetrapropyl phosphonium hydroxide, tetrabutyl phosphonium hydroxide, tetraphenyl phosphonium hydroxide, trimethylphenyl phosphonium hydroxide, or the like; a primary, secondary, or tertiary amine compound; or a nitrogen-containing aromatic derivative, such as pyridine.

The concentration of the non-metal compound catalyst may be in the range of $10^{-6}$ to $10^{-1}$ mol, preferably, $10^{-5}$ to $10^{-2}$ mol, and more preferably, of $10^{-4}$ to $10^{-3}$ mol, based on 1 mol of the dihydroxy compound that is used as a starting material used for the transesterification process according to an embodiment of the present invention. When the concentration of the non-metal compound catalyst is less than $10^{-6}$ mol based on 1 mol of the dihydroxy compound, the non-metal compound catalyst fails to sufficiently exert its activity at the beginning of the reaction. When the concentration of the non-metal compound catalyst is greater than $10^{-1}$ mol based on 1 mol of the dihydroxy compound, production costs are high.

The compound containing an alkali metal or alkali earth metal may be, but is not limited to, a hydroxide, carbonate, acetate, alkoxide, or borohydroride compound which each contains Li, Na, K, Ru, Cs, Be, Mg, Ca, Sr, Ba, or the like.

The concentration of the compound containing an alkali metal or an alkali earth metal may be in the range of $10^{-8}$ to $10^{-3}$ mol, preferably, of $10^{-7}$ to $10^{-4}$ mol, and more preferably, of $10^{-6}$ to $10^{-5}$ mol, based on 1 mol of the aromatic dihydroxy compound that is used as a starting material for the transesterification process according to an embodiment of the present invention. When the concentration of the compound containing an alkali metal or an alkali earth metal is less than $10^{-8}$ mol based on 1 mol of the dihydroxy compound, the catalyst fails to sufficiently exert its activity in a late part of the reaction. When the concentration of the compound containing an alkali metal or an alkali earth metal is greater than $10^{-3}$ mol, production costs are high, and physical properties, such as heat resistance and hydrolysis resistance of the modified polycarbonate with siloxane groups that is the final product, may be bad.

The aromatic dihydroxy compound that is one of starting materials used for the transesterification according to an embodiment of the present invention may be represented by formula 2:

The diarylcarbonate that is one of the starting materials for the transesterification may be a compound represented by formula 5 or a compound represented by formula 6:

A polysiloxane compound that is a starting materials used for the transesterification may be a compound represented by formula 15:

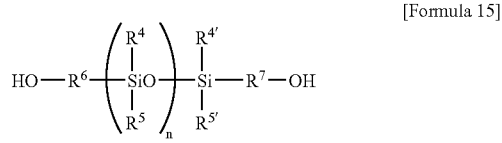

[Formula 15]

where n is an integer of 1 through 500;

$R^4$, $R^{4'}$, $R^5$ and $R^{5'}$ are each independently a hydrogen atom or a C1-C20 alkyl group, wherein some or all of the hydrogen atoms of the alkyl group may be substituted with halogen atoms; and $R^6$ and $R^7$ are each independently a linear or branched C1-C20 alkylene group, a monocyclic or polycyclic C6-C30 arylene group, or —$R^8$—X—$R^9$—, wherein $R^8$ and $R^9$ are each independently a substituted or non-substituted C1-C20 alkylene group or a substituted or non-substituted C6-C30 arylene group; and X is —O—, —S—, —SO—, —$SO_2$—, or —CO—.

The polysiloxane compound represented by formula 15 may be polydialkylsiloxane-bisalkyloxyalcohol or the like.

The polysiloxane compound that is a starting material for the transesterification according to an embodiment of the present invention may be a compound represented by formula 16:

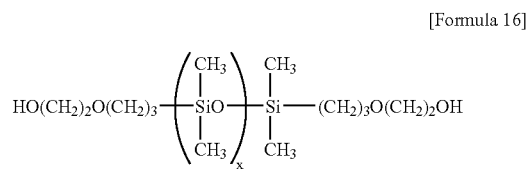

[Formula 16]

where x is an integer of 1 through 500.

The concentration of the diarylcarbonate may be in the range of 1.0 to 1.5 mol, preferably, 1.0 to 1.3 mol, and more preferably, 1.0 to 1.2 mol, based on 1 mol of the dihydroxyl compound. When the concentration of the diarylcarbonate is outside this range, a degree of polymerization is low. As with the modified polycarbonate with ester groups, the degree of polymerization may be given by Equations 1 and 2.

The content of polysiloxane added may be in the range of 0.01 to 20 mol %, preferably, of 0.1 to 15 mol %, and more preferably, of 0.5 to 5 mol %, based on the dihydroxyl compound. When the content is less than 0.01 mol %, the effect of the modification becomes negligible. When the content is greater than 20 mol %, the concentration of the polysiloxane increases locally and the polysiloxane becomes gellated. Such a gelling disadvantageously affects the reaction.

When a modified polycarbonate resin is produced through the transesterification according to an embodiment of the present invention, when needed, additives such as a terminator, an antioxidant, a branching agent, and the like may be additionally used. Examples, conditions, and the like for the additives are described above.

In addition, reaction conditions, such as a reaction temperature, a reaction pressure, or the like, of (the transesterification step) are described above.

Step 2: Condensation Polymerization

The low molecular weight modified polycarbonate prepolymer with siloxane groups having the weight average molecular weight of 1,500 to 20,000 g/mol, which is prepared through the transesterification, is subjected to condensation polymerization under a reduced pressure at high temperature, or under a nitrogen atmosphere. As a result of the condensation polymerization, diarylcarbonate that exists in unreacted form during the transesterification, side products having a degree of polymerization of less than 3, and a reaction side product that is produced during the reaction, such as phenol, are removed, and a medium molecular weight amorphous modified polycarbonate with siloxane groups which has a greater molecular weight than the low molecular weight of amorphous modified polycarbonate with siloxane groups prepolymer is produced.

In the condensation polymerization, unreacted diarylcarbonate which is not involved in the reaction due to its relatively low boiling point and reaction side products having a degree of polymerization of less than 3 are vaporized together with phenol to be extracted outside the reactor. Such a removing process effectively increases the molecular weight of a modified polycarbonate during the solid state polymerization relative to a conventional process.

In a conventional process, excess diarylcarbonate that is not used in the transesterification process and reaction side products having a degree of polymerization of less than 3 are not removed through a condensation polymerization process before the solid state polymerization. In addition, as the molecular weight of the prepolymer increases, the difference between a mole fraction of arylcarbonate end-group of the produced prepolymer and that of the aromatic hydroxyl end-group is enlarged. Therefore, the solid state polymerization process used to produce a high molecular weight modified polycarbonate with siloxane groups is prolonged.

The condensation polymerization according to the current embodiment of the present invention may be performed using a conventional condensation reactor, such as a rotating disk reactor, a rotating cage reactor, or a thin film reactor.

The condensation polymerization may be performed at 180 to 330° C., and preferably, 200 to 300° C.

In the condensation polymerization process, unreacted dialkyl(aryl)carbonate that exists after the transesterification, reaction side products having a degree of polymerization of less than 3, and phenol produced as a side product are removed under a reduced pressure of 0-50 mmHg, preferably 0-20 mmHg, in the high temperature range described above.

According to an embodiment of the present invention, injected nitrogen may be used instead of the reduced pressure to remove the reaction side products. In this case, the amount of nitrogen that is injected is in the range of 0.01 to 1.0 $Nm^3$/kg h. The reaction time may vary according to reaction conditions, and may be in the range of 2 to 120 minutes.

The weight average molecular weight of the medium molecular weight amorphous modified polycarbonate prepolymer with Siloxane groups prepared in the above-described process may be in the range of 1,000 to 30,000 g/mol.

The present invention will be described in further detail with reference to the following examples. These examples are for illustrative purposes only and are not intended to limit the scope of the present invention.

EXAMPLES

Example 1

(Production of Amorphous Modified Polycarbonate Prepolymer with Ester Groups)

1,500 g (6.57 mol) of bisphenol-A, 1,463 g (6.83 mol) of diphenylcarbonate, and 15.89 g ($6.9 \times 10^{-2}$ mol) of a 1,10-decanedicarboxylic acid were mixed and the mixture was added into a reactor in a nitrogen atmosphere. Then, $2.5 \times 10^{-4}$ mole of a dibutyltin oxide per mol of bisphenol-A was added to the reactor as a polymerization catalyst. The resulting reactants were mixed and reacted at a jacket temperature of 230° C. for 5 minutes. Then, under a reduced pressure of 1 to 4 mmHg, an esterification reaction and a transesterification reaction were performed for 30 minutes. As a result, a low molecular weight amorphous modified polycarbonate prepolymer with ester groups having a number average molecular weight of 3,452 g/mol was produced.

(Production of Amorphous Modified Polycarbonate with Ester Groups Through Condensation Polymerization)

The low molecular weight amorphous modified polycarbonate prepolymer with ester groups that had been prepared, was fed into a thin film reactor at a temperature of 300° C. under the reacting pressure of 1 mmHg or less. The condensation polymerization of it occurred for 30 minutes. As a result, a medium molecular weight amorphous modified polycarbonate with ester groups having a number average molecular weight of 5,342 g/mol was produced.

(Intensive Solid Polymerizing Process—Production of High Molecular Weight Modified Polycarbonate with Ester Groups)

The modified polycarbonate with ester groups having a number average molecular weight of 5,342 g/mol (polydispersity index (PDI)=2.69) that had been prepared through melt condensation polymerization was dissolved in 2 L of methylenechloride with agitation to produce a 15 wt % a solution. As illustrated in FIG. 1, the solution was sprayed together with compressed nitrogen gas, which was injected at a speed of 400 L/h, into an intensive solid state polymerization reactor through a nozzle. The sprayed solution was contacted with hot nitrogen gas provided from the bottom site of the reactor to vaporize the entire solvent, so that crylstallized modified polycarbonate with ester groups in a form of dry particles were collected in the coagulating vessel under the reactor.

Hot nitrogen gas at 200° C., which was provided from below the polymerizing unit was cooled to 140° C. by a temperature controlling unit, and then the cooled nitrogen gas was contacted with the solution. The solvent vaporized and the nitrogen gas in a drying unit were passed through a cyclone attached to an upper side of the reactor, and then subjected to a condensing unit to be separated into a liquid solvent and a gaseous nitrogen. The liquid solvent was refluxed to the dissolving chamber with agitator, and the gaseous nitrogen was refluxed to a heater through a compressor. In the drying unit, a small number of particles having very low crystallinity of less than 5% and a diameter of less than 80 μm could be obtained, which particles were collected in the cyclone attached to the upper site of the reactor and refluxed to the agitator. The size of the crystallized particles collected from the bottom of the reactor was investigated by using a scanning electron microscope and an image analyzer. As a result, it was found that the crystallized particles were homogenous in size and had an average diameter of 400 μm±35 μm. In addition, the crystallinity of the crystallized particles was measured by using a differential scanning calorimeter, and the degree of crystallinity was 22.8%.

After the crystallized particles were solid-state polymerized in the reactor for 12 hours, the molecular weight was measured. As a result, the number average molecular weight of the high-molecular weight modified polycarbonate with ester groups was 20,463 g/mol, and the PDI was 3.06.

The number average molecular weights and PDIs for various reaction times are shown in Table 1.

Comparative Example 1

(Transesterification—Production of Modified Polycarbonate Prepolymer with Ester Groups)

1,500 g (6.57 mol) of bisphenol-A, 1,463 g (6.83 mol) of diphenylcarbonate, and 15.89 g ($6.9 \times 10^{-2}$ mol) of a 1,10-decanedicarboxylic acid were mixed and the mixture was added into a reactor in a nitrogen atmosphere. The reactants were mixed and reacted at a jacket temperature of 230° C. for 5 minutes. Then, under a reduced pressure of 1 to 4 mmHg, an esterification reaction and a transesterification reaction were performed for 30 minutes. As a result, a low molecular weight amorphous modified polycarbonate prepolymer with ester groups having a number average molecular weight of 3.452 g/mol was produced.

(Crystallization—Production of Crystallied Modified Polycarbonate with Ester Groups)

The low molecular weight modified polycarbonate prepolymer with ester groups (PDI=2.38) that was prepared through the transesterification was dissolved in methylenechloride to a concentration of 0.1 g/mL. The crystallized particles were precipitated by adding methanol as a nonsolvent into the solution. The amount of the methanol was 2 times larger than that of the solution. In this case, an average diameter of the crystallized modified polycarbonate with ester groups was 570 μm, and many lumps of the crystallized particles having a diameter of greater than 10 mm were observed. Accordingly, in order to perform the solid state polymerization, the lumps of the crystallized particles needed to be milled and fractionated. The milled and fractionated particles had a diameter of 200 μm±42 μm, and a degree of crystallinity that was measured by using differential scanning calorimeter was 20.2%.

(Solid Polymerizing Process—Production of High Molecular Weight Modified Polycarbonate with Ester Groups)

The crystallized, milled and fractionated modified polycarbonate with ester groups produced was added to solid state polymerization reactor, and nitrogen was continuously injected at a speed of 3 L/min from below the reactor. The solid state polymerization process was performed at a constant temperature of 200° C. to produce a high-molecular weight modified polycarbonate with ester groups. The results are shown in Table 1.

TABLE 1

| Solid Polymerization Time | Example 1 | | Comparative Example 1 | |
| --- | --- | --- | --- | --- |
| | Number Average Molecular Weight | Polydispersity Index | Number Average Molecular Weight | Polydispersity Index |
| 0 | 5,342 | 2.69 | 3,452 | 2.38 |
| 2 | 11,899 | 2.75 | 10,328 | 2.62 |
| 4 | 15,574 | 2.82 | 11,846 | 2.86 |
| 6 | 16,623 | 2.89 | 11,980 | 3.06 |
| 8 | 17,878 | 2.94 | 12,560 | 3.34 |
| 10 | 19,744 | 3.00 | 12,788 | 3.59 |
| 12 | 20,463 | 3.06 | 12,532 | 3.84 |

As shown in Table 1, according to Example 1 in which an amorphous modified polycarbonate with ester groups was melt condensation polymerized and spray crystallized and then solid-state polymerized to produce a high-molecular weight crystallized modified polycarbonate with ester groups, the number average molecular weight of the modified polycarbonate with ester groups was over 15,000 g/mol after 4 hours of the solid state polymerization. On the other hand, according to Comparative Example 1 in which an amorphous modified polycarbonate with ester groups was transesterified and crystallized by the conventional non-solvent precipitation, and then solid-state polymerized, The number average molecular weight of the modified polycarbonate with ester groups could hardly reach to 13,000 g/mol, even though the solid state polymerization time was over 10 hours.

When comparing Example 1 with Comparative Example 1, it was found that a degree of crystallinity of the crystallized particles produced in Example 1 according to the present invention was in the range of 20% to 30% suitable for solid state polymerization. In addition, unlike the results of Comparative Example 1, crystallized particles produced in Example 1 had a narrow diameter distribution with the deviation was within less than 20% of an average diameter of 80-3,000 μm, which was controlled by varying spray conditions without milling.

Further, the present invention does not require additional drying process and milling and fractionation process, which are required for a conventional process, and thus, the operation time and operation costs can be substantially reduced. Ultimately, after solid state polymerization for 12 hours, the number average molecular weight of a high-molecular weight the modified polycarbonate with ester groups produced in Example 1 was increased to 20,463 g/mol.

After the solid state polymerization, the polydispersity index of the modified polycarbonate with ester groups was increased by only 14.0% in Example 1, which is a quarter of the increase in the polydispersity index of 61.3% in Comparative Example 1. Accordingly, in Example 1, the formation of a low quality product, which is indicated by a high polydispersity index of it, could be prevented, and the product having homogenous molecular weights and physical properties could be stably obtained in a large quantity.

Example 2

(Production of Amorphous Modified Polycarbonate Prepolymer with Siloxane Groups)

1,484 g (6.50 mol) of bisphenol-A, 1,478 g (6.9 mol) of diphenylcarbonate, and 5.08 g ($1.13 \times 10^{-3}$ mol) of a dihydroxyl polysiloxane (Dow Corning 3058) were mixed and the mixture was added into a reactor in a nitrogen atmosphere. Then, $1\times10^{-6}$ mol of a sodium acetic acid and $2.5\times10^{-4}$ mole of a tetrabutylphosphonium hydroxide per 1 mol of bisphenol-A, which were used as polymerization catalysts, were added to the reactor. The reactants were mixed and reacted at a jacket temperature of 230° C. for 5 minutes. Then, under a reduced pressure of 1 to 4 mmHg, a transesterification reaction was performed for 30 minutes. As a result, an amorphous modified polycarbonate prepolymer with siloxane groups having a weight average molecular weight of 8,804 g/mol was produced.

(Production of Amorphous Modified Polycarbonate with Siloxane Groups Through Condensation Polymerization)

The low molecular weight amorphous modified polycarbonate prepolymer with siloxane groups was fed into a thin film reactor at a temperature of 300° C. under a pressure of 1 mmHg or less. The condensation polymerization of it occurred for 30 minutes. As a result, an amorphous modified polycarbonate with siloxane groups having a weight number average molecular weight of 15,578 g/mol was produced.

(Intensive Solid Polymerizing Process—Production of High Molecular Weight Modified Polycarbonate with Siloxane Groups)

The amorphous modified polycarbonate with siloxane groups having a weight average molecular weight of 15,578 g/mol (PDI=2.79) prepared through melt condensation polymerization was dissolved in 2L-methylenechloride to produce a 15 wt % solution. Referring to FIG. 1, the solution was sprayed together with compressed nitrogen gas, which was injected at a speed of 400 L/h, into an intensive solid state polymerization reactor through a nozzle. The sprayed solution was contacted with hot nitrogen gas provided from below the reactor to vaporize the entire solvent, so that a crylstallized modified polycarbonate with siloxane groups in the form of dry particles was obtained.

The size of the crystallized particles obtained was measured using a scanning electron microscope and an image analyzer. As a result, it was found that crystallized particles were homogenous in size and had an average diameter of 400 μm±35 μm. In addition, the crystallinity of the crystallized particles was measured using a differential scanning calorimeter, and the degree of crystallinity was 23.2%.

When crystalline particles stayed in the polymerizing unit for 10 hours, the resulting high-molecular weight modified polycarbonate with siloxane groups was measured. As a result, the weight average molecular weight of the high-molecular weight siloxane-based copolycarbonate was 39,500 g/mol, and the PDI was 3.19.

The weight average molecular weights and PDIs for various reaction times are shown in Table 2.

Comparative Example 2

(Transesterification—Production of Modified Polycarbonate Prepolymer with Siloxane Groups)

1,484 g (6.50 mol) of bisphenol-A, 1,478 g (6.9 mol) of diphenylcarbonate, and 5.08 g ($1.13\times10^{-3}$ mol) of a dihydroxyl polysiloxane (Dow Corning 3058) were mixed and the mixture was added to a reactor in a nitrogen atmosphere. The reactants were mixed and reacted at a jacket temperature of 230° C. for 5 minutes. Then, under a reduced pressure of 1 to 4 mmHg, a transesterification reaction was performed for 30 minutes. As a result, a low molecular weight amorphous modified polycarbonate prepolymer with siloxane groups having a weight average molecular weight of 8,804 g/mol was produced.

(Crystallization—Production of Crystallized Modified Polycarbonate with Siloxane Groups)

The low molecular weight modified polycarbonate prepolymer with siloxane groups (PDI=2.40) that was prepared through the transesterification, was dissolved in methylenechloride to a concentration of 0.1 g/mL. The crystallized particles were precipitated by adding methanol, of which amount was 2 times greater than that of the solution, as a non-solvent, so that powdered crystallized modified polycarbonate with siloxane groups was obtained. In this case, an average diameter of the crystallized particles was 570 μm, and many lumps of the crystallized particles having a diameter of greater than 10 mm were produced. Accordingly, in order to perform solid state polymerization, the lumps of the crystallized particles needed to be milled and fractionated. The milled and fractionated particles had a diameter of 200 μm±42 μm, and a degree of crystallinity that was measured using differential scanning calorimeter was 20.5%.

(Solid Polymerizing Process—Production of High Molecular Weight Modified Polycarbonate with Siloxane Groups)

The crystallized modified polycarbonate with siloxane groups was fed into a typical solid-state polymerization reactor, and hot nitrogen gas was continuously injected at a speed of 3L/min from below the reactor. In this state, the solid state polymerization was performed at a constant temperature of 200° C. to produce a high-molecular weight of modified polycarbonate with siloxaneg groups. The results are shown in Table 2.

TABLE 2

| | Example 2 | | Comparative Example 2 | |
|---|---|---|---|---|
| Time | Weight Average Molecular Weight | PDI | Weight Average Molecular Weight | PDI |
| 0 | 15578 | 2.79 | 8804 | 2.4 |
| 2 | 33876 | 2.88 | 30225 | 2.69 |
| 4 | 35957 | 2.97 | 30982 | 2.96 |
| 6 | 38002 | 3.04 | 33324 | 3.23 |
| 8 | 38624 | 3.12 | 33996 | 3.52 |
| 10 | 39500 | 3.19 | 34523 | 3.8 |

As shown in Table 2, according to Example 2, the modified polycarbonate with siloxane groups having a weight average molecular weight of 35,000 g/mol was produced within four hours. On the other hand, according to Comparative Example 2, the modified polycarbonate with siloxane groups having a weight average molecular weight of 35,000 g/mol could hardly obtained even after 10 hours of the reaction time.

By comparing Example 2 with Comparative Example 2, it was found that a degree of crystallinity of crystallized particles produced in Example 2 according to the present invention was in the range of 20% to 30% suitable for solid state polymerization, compared to Comparative Example 2. Additionally, crystallized particles produced according to Example 2 have a narrow diameter distribution of which the deviation was within 20% of the average diameter of 80-3,000 μm, which was controlled by varying spray conditions without milling and fractionation.

Further, the present invention does not require additional drying process, milling process and fractionation process, which are required for a conventional process, and thus, that the operation time and operation costs can be reduced substantially. Ultimately, after solid state polymerization for 10 hours, the weight average molecular weight in Example 2 was increased to 39,500 g/mol.

In Example 2, after the solid state polymerization, the polydispersity index was increased by only 14.5%, which is a quarter of the increase in the polydispersity of 58.1% in Comparative Example 2. Accordingly, in Example 2, the formation of a low quality product, which is indicated by a high polydispersity index of it, could be prevented, and the product having homogenous molecular weights and physical properties could be stably obtained in a large quantity.

In the method of producing a modified polycarbonate resin according to the present invention, a solid-state polymerizing process can be performed without additional drying, milling and fractionation processes so that operation time and operation costs can be reduced. In addition, crystallinity and size of crystallized particles can be efficiently controlled to produce a high-molecular modified polycarbonate having uniform properties.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of producing a high-molecular weight modified polycarbonate resin, has a functional group other than a carbonate group in the chemical structure, which comprising: concurrently spray crystallizing and solid-state polymerizing an amorphous modified polycarbonate after preparation of the modified polycarbonate solution by dissolving it in a solvent.

2. The method of claim 1, wherein the amorphous modified polycarbonate is one of polycarbonate with ester groups or siloxane groups in its chemical structure.

3. The method of claim 1, wherein the solvent is methylenechloride, chloroform, tetrahydrofurane, metacrezole, cyclohexane, dioxane, dimethylaldehyde, pyridine, or a mixture of these.

4. The method of claim 1, wherein the concentration of the amorphous modified polycarbonate solution is in the range of 5.0 to 50% by weight.

5. The method of claim 1, wherein the crystallizing of the amorphous modified polycarbonate comprises spraying the amorphous modified polycarbonate solution through a nozzle and contacting the sprayed solution with a high-temperature gas to vaporize the solvent so that the solvent is removed and a crystalline modified polycarbonate is produced.

6. The method of claim 5, wherein the nozzle is one of a pressure nozzle or a pneumatic nozzle.

7. The method of claim 6, wherein the nozzle is the pressure nozzle and the amorphous modified polycarbonate solution is sprayed at a spray pressure of 2.0-51.0 kgf/cm$^2$.

8. The method of claim 6, wherein the nozzle is the pneumatic nozzle and a compressed gas is injected at an injection speed of 200-800 L/hour.

9. The method of claim 8, wherein the compressed gas comprises at least one gas selected from the group consisting of $N_2$, air, and $CO_2$.

10. The method of claim 5, wherein the high-temperature gas is $N_2$, air, or $CO_2$ at a temperature of 40-250° C.

11. The method of claim 5, wherein the average diameter of the crystallized modified polycarbonate particles is 80-3000 μm and the range of error thereof is less than 30%.

12. A method of producing a modified polycarbonate resin, has a functional group other than a carbonate group in the chemical structure, the method comprising:
spray crystallizing an amorphous modified polycarbonate to produce a crystallized modified polycarbonate; and
solid-state polymerizing the crystallized modified polycarbonate to produce a high-molecular weight modified polycarbonate.

13. The method of claim 12, wherein the amorphous modified polycarbonate is an amorphous modified polycarbonate with ester groups having a number average molecular weight of 3,000-20,000 g/mol, and the solid-state polymerized modified polycarbonate is a modified polycarbonate with ester groups having a number average molecular weight of 15,000-200,000 g/mol.

14. The method of claim 12, wherein the amorphous modified polycarbonate is an amorphous modified polycarbonate with siloxane groups having a weight average molecular weight of 10,000-30,000 g/mol, and the solid-state polymerized modified polycarbonate is a modified polycarbonate with siloxane groups having a weight average molecular weight of 20,000-200,000 g/mol.

15. The method of claim 12, wherein the amorphous modified polycarbonate is produced through an interfacial polymerization process, through transesterification of a dialkyl(aryl)carbonate and an aromatic dihydroxy compound, or through transesterificaton and condensation of dialkyl(aryl)carbonate and an aromatic dihydroxy compound.

16. The method of claim 12, wherein the spray crystallizing of the amorphous modified polycarbonate comprises: dissolving an amorphous modified polycarbonate in a solvent to prepare a solution; spraying the solution through a nozzle; and contacting the sprayed solution with a high-temperature gas to vaporize the solvent so that the solvent is removed and a crystallized modified polycarbonate is produced.

* * * * *

UNITED STATES PATENT AND TRADEMARK OFFICE
CERTIFICATE OF CORRECTION

PATENT NO.        : 7,368,521 B2                                          Page 1 of 1
APPLICATION NO. : 11/268192
DATED             : May 6, 2008
INVENTOR(S)       : Mijeung Hong et al.

It is certified that error appears in the above-identified patent and that said Letters Patent is hereby corrected as shown below:

Column 2, line 61, ".)" should read --).--.
Column 5, line 14, "particle" should read --particles--.
Column 16, line 8, "materials" should read --material--.
Column 18, line 28, delete comma after "prepared.".
Column 18, line 50, "were" should read --was--.
Column 20, line 28, "The" should read --the--.
Column 23, line 27, after the word "resin," insert the word --which--.
Column 23, line 28, delete the comma and the word "which".
Column 23, line 34, "polycarbonate" should read --polycarbonates--.
Column 24, line 14, after the word "resin," insert the word --which--.
Column 24, line 15, delete the comma and the words "the method".

Signed and Sealed this

Twenty-eighth Day of July, 2009

JOHN DOLL
*Acting Director of the United States Patent and Trademark Office*